(12) United States Patent
Leymann et al.

(10) Patent No.: US 6,507,844 B1
(45) Date of Patent: Jan. 14, 2003

(54) METHOD AND SYSTEM FOR MINIMIZING NETWORK TRAFFIC

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,128

(22) Filed: Nov. 12, 1999

(30) Foreign Application Priority Data

Nov. 20, 1998 (DE) .......................................... 98 122 017

(51) Int. Cl.⁷ .............................................. G06F 17/30
(52) U.S. Cl. ................................ 707/8; 707/10; 707/2; 709/104; 709/226; 709/235
(58) Field of Search ................... 707/10, 8, 2; 709/201, 709/224, 223, 226, 235, 104

(56) References Cited

U.S. PATENT DOCUMENTS

| | | | | |
|---|---|---|---|---|
| 5,675,797 A | * | 10/1997 | Chung et al. ................ | 709/104 |
| 5,712,981 A | * | 1/1998 | McKee et al. ............... | 709/224 |
| 5,724,556 A | * | 3/1998 | Souder et al. ............... | 345/835 |
| 5,884,326 A | * | 3/1999 | Weinger et al. ............. | 707/10 |
| 5,924,094 A | * | 7/1999 | Sutter ......................... | 707/1 |
| 5,937,388 A | * | 8/1999 | Davis et al. ................. | 705/1 |
| 5,960,420 A | * | 9/1999 | Leymann et al. ............ | 705/8 |
| 5,970,488 A | * | 10/1999 | Crowe et al. ................ | 707/10 |
| 6,052,684 A | * | 4/2000 | Du ............................... | 707/8 |
| 6,078,982 A | * | 6/2000 | Du et al. ..................... | 707/8 |
| 6,219,675 B1 | * | 4/2001 | Pal et al. ..................... | 707/1 |
| 6,237,020 B1 | * | 5/2001 | Leymann et al. ............ | 709/201 |
| 6,341,303 B1 | * | 1/2002 | Rhee et al. .................. | 709/103 |

OTHER PUBLICATIONS

Khunboa et al, Network Trafficc Characterization of Distributed Database Applications, IEEE, 1998, pp. 98–105.*
Hepner et al, Integrating Heterogeneneous Database: A Distributed Model, IEEE 1997, pp. 695–702.*
Bestarios, Demand–based Document Dissemination to reduce Traffic and Balance Load in Distributed Information System, IEEE 1995, pp. 338–345.*
Stumm et al, Algorithms Implementing Distributed Shared Memory, IEEE 1990, pp. 54–64.*
D. J. Spoon: "Project Management Environment", IBM Technical Disclosure Bulletin, vol. 32, No. 9A, Feb. 1990, pp. 250 to 254.
R. T. Markshak: "IBM's FlowMark, Object–Oriented Workflow for Mission–Critical Applications", Workgroup Computing Report (USA), vol. 17, No. 5, 1994, pp. 3 to 13.

(List continued on next page.)

Primary Examiner—John Breene
Assistant Examiner—Debbie M. Le
(74) Attorney, Agent, or Firm—Jerry W. Herndon

(57) ABSTRACT

A method for minimizing network traffic of distributed applications operating in a distributed environment in a networked computer system, comprising a plurality of workstations and a plurality of database management systems (DBMS) managing data in a set of distributed tables for use by the workstation. The method derives from process models a placement of tables resulting in minimal network traffic when the process model is executed and thereby lowering costs and average response times. The invention can be advantageously applied to workflow management systems.

2 Claims, 6 Drawing Sheets

OTHER PUBLICATIONS

F. Leymann and D. Roller: "Business Process Management with FlowMark", Digest of papers, Cat. No. 94CH3414–0, Spring COMPCON 94, 1994, pp. 230 to 234.

F. Leymann: "A meta model to support the modeling and execution of processes", Proceedings of the 11$^{th}$ European Meeting on Cybernetics and System Research EMCR92, Vienna, Austria, Apr. 21 to 24, 1992, World Scientific 1992, pp. 287–294.

"IBM FlowMark for OS/2", document No. GH 19–8215–01, IBM Corporation, 1994.

"Modeling Workflow", document No. SH 19–8241, IBM Corporation, 1996.

IBM MQSeries Concepts and Architecture, document No. GH 12–6285.

IBM MQSeries Getting Started with Buildtime, document No. SH 12–6286.

IBM MQSeries Getting Started with Runtime, document No. SH 12–6287.

F. Leymann and W. Altenhuber: "Managing business processes as an information resource", IBM Systems Journal, vol. 32 (2), 1994.

D. Roller: "Verifikation von Workflows in IBM FlowMark" in J. Becker and G. Vossen (Hrsg.).

H. A. Inniss and J. H. Sheridan: "Workflow Management Based on an Object–Oriented Paradigm", IBM Technical Disclosure Bulletin, vol. 37, No. 3, Mar. 1994, p. 185.

* cited by examiner before minimization after minimization

METHOD AND SYSTEM FOR MINIMIZING NETWORK TRAFFIC

BACKGROUND OF THE INVENTION

1. Field of the Invention

The present invention relates to distributed applications running in networked computer systems. In particular, the present invention relates to method and system for minimizing database related network traffic in such systems.

2. Description and Disadvantages of Prior Art

The subject matter of the present invention is applicable to a broad variety of applications, i.e. whenever an application has a distributed nature and when data storages are commonly accessed by a plurality of workstations hosting some copy of said distributed application and are distributed in the network. Further, workflow management systems, referred to herein as WFMSs are preferred objects for being subjected to the improvements of the present invention. But basically, every system that can be described with the basic structure and terminology of WFMSs, can advantageously be improved by applying the method according to the invention. For clear terminology and improved clarity the present invention will be disclosed herein in detail as applied to WFMSs and with the terminology of relational database systems by way of example only.

A new area of technology with increasing importance is the domain of Workflow-Management-Systems (WFMSs). WFMSa, as for example implemented by the IBM product FlowMark, support the modeling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by some type of network.

The process of designing, developing and manufacturing a new product and the process of changing or adapting an existing product presents many challenges to product managers and engineers to bring the product to market for the least cost and within schedule, while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e. g. development or production processes, is of enormous importance for a company and has significant influence on company's overall success in the market place. Therefore, those processes have to be regarded as similar to technology processes and have to be tested, optimized and monitored. The management of such processes is usually performed and supported by a computer based process or workflow management system.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modeling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modeling of business processes as well as their execution are discussed. The product IBM FlowMark is available for different computer platforms and documentation for IBM FlowMark is available in every IBM branch.

In F. Leymann: "A meta model to support the modeling and execution of processes", Proceedings of the 11th European Meeting on Cybernetics and System Research EMCR92, Vienna, Austria, April 21 to 24, 1992, World Scientific 1992, pages 287 to 294, a meta model for controlling business processes is presented and discussed in detail.

The "IBM FlowMark for OS/2",document number GH 19-8215-01, IBM Corporation, 1994, available in every IBM sales office, represents a typical modern, sophisticated, and powerful workflow management system. It supports the modeling of business processes as a network of activities; refer for instance to "Modeling Workflow", document number SH 19-8241, IBM Corporation, 1996. Further information on Workflow Management Systems available from IBM is contained in: IBM MQSeries Concepts and Architecture, document number GH 12-6285; IBM MQSeries Getting Started with Buildtime, document number SH 12-6286; IBM MQSeries Getting Started with Runtime, document number SH 12-6287. A process model is constructed as a directed, acyclic, weighted, colored graph. The nodes of the graph represent the activities or work items which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e.g. by assigning tasks to a work list according to a respective person, wherein said work list is stored as digital data within said workflow or process management computer system.

In F. Leymann and W. Altenhuber: "Managing business processes as an information resource", IBM Systems Journal, Vol. 32(2), 1994, the mathematical theory underlying the IBM FlowMark product is described.

In D. Roller: "Verifikation von Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore, the feature of graphical animation for verification of the process logic is presented as it is implemented within the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable. At runtime, an instance of the process is created from the process model; this is called a process instance. This process instance is then interpreted dynamically by the IBM FlowMark product.

A user typically interacts with the workflow management system via a graphical end user interface that represents the tasks to be performed by the user as icons. Work for a particular task is started by the user by double-clicking on the appropriate icon, which in turn starts the program implementing the activity.

It is important for the productivity of the user that the program complete its access to data as fast as possible to avoid delays in interacting with the user. In many cases WFMSs are executed by a multitude of distributed computer systems accessing resources/objects that also are spread across the computer network. In such distributed environment, a user who controls execution of an activity assigned as a work item to him or her could suffer sever performance degradations until the system has been able to provide all the required resources/objects. The problem becomes even worse if the activity has to access large resources/objects or if the activity requires access to a large number of resources/objects distributed across a large number of different computer systems.

Considering now aspects closer to the focus of the present invention, WFMSs, as for example implemented by IBM FlowMark, are characterized by the fact that activities within the application may be executed on different computer systems in the network. Such different systems can include systems with different operating systems.

The activities to be performed have typically a fine structure:

An Activation Condition defines when the activity is ready for scheduling by the workflow manager; an Exit Condition defines when an activity should be treated as complete by the workflow manager. The core of the activity is the Task which is comprised of the proper activity and a query on an organization database. The Proper Activity associates the activity with a program object. The program object defines for each operating system, and possibly for each user, the name and operational characteristics of an executable piece of software. The executable piece of software is started when the activity is performed by a user. The query on the organization database defines the persons responsible for performing the activity. When the activity is ready to be scheduled, the workflow management executes the specified query against the organization database. This query returns a set of persons, to which the activity is assigned. The task is transformed into a set of work items, one for each person selected as the result of the query against the organization database. A work item contains the name of the person responsible for its completion and the program to be executed. These work items are made part of the users' worklist.

Each of the activities is performed by an activity implementation. The activity implementations are typically programs, but they may also be invocations of method objects or stored procedures in a relational data base.

The results produced by the work represented with an activity is put into an output container, which is associated with each activity. Since an activity will, in general, require access to output containers of other activities, each activity may also be associated with an input container. At runtime, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

The data accessed by the activity implementations may be data which is specific to one particular activity implementation or it may be data which is shared between different activity implementations. Processes are typically associated with a set of business objects; thus sharing data is the typical case. As these business objects are often made persistent in relational databases, relational database terminology is used herein to describe the access of activity implementations to data. Nevertheless, any other persistent data storage mechanism could be used instead.

The different activities of a process are executed by different users working on different workstations that may be attached to different servers. The activity implementations are executed either solely on the user's workstation or on the associated server in case of a client/server application. Regardless of where the activity is implemented, it requires that some, possibly all, activity implementations need to access data using some network connectivity.

Consequently, a large network traffic develops when a complex business process is executed. The network traffic consists in a large number of data flows between a plurality of nodes in the network. Large network traffic, however, results in longer response times to the user and possibly in a corresponding safety risk implied by the transport of data through the network.

To handle this problem, data streams are compressed and encrypted. The amount of network traffic, however, is still large.

OBJECTS OF THE INVENTION

Therefore, an object of the present invention is to provide a method for minimizing the database related network traffic caused by distributed applications running in networked computer systems accessing distributed data.

SUMMARY AND ADVANTAGES OF THE INVENTION

The object of the invention is achieved by the features stated in the independent claims. Further advantageous arrangements and embodiments of the invention are set forth in the respective dependent claims.

A method for minimizing network traffic of distributed applications is proposed. The method operates in a distributed environment in a networked computer system comprising a plurality of workstations and a plurality of database management systems (DBMS). The DBMSs manage data in a set of tables for use by the workstations. Workflow between the tables and other system parameters are used to derive from process models a placement of tables that results in minimal network traffic when the process model is executed. The network traffic is minimized by choosing the locations of data storages, and in particular the locations of data base tables such that the overall network traffic in and out of these data base tables is minimized.

The method of the present invention with the characteristics of claim 1 has the advantage, in relation to the method sketched out in the discussion of prior art technique, that the network traffic is minimized. Consequently, the average response time is lowered and costs are reduced.

In a preferred embodiment of the invention as set forth in claim 2 the method is applied to WFMSs. This extends the advantages mentioned above for those systems.

In a preferred embodiment of the invention as set forth in claim 3, traffic is calculated including number and type of database calls for each activity and the locations where the activities are executed is determined. This is a systematic means for determining how to minimize the workflow. Thus, the advantages mentioned above are further enhanced.

BRIEF DESCRIPTION OF THE DRAWINGS

The present invention is illustrated by way of example in the accompanying drawing in which.

DESCRIPTION OF THE PREFERRED EMBODIMENT

Introduction to the Inventive Concept

Figure 1:
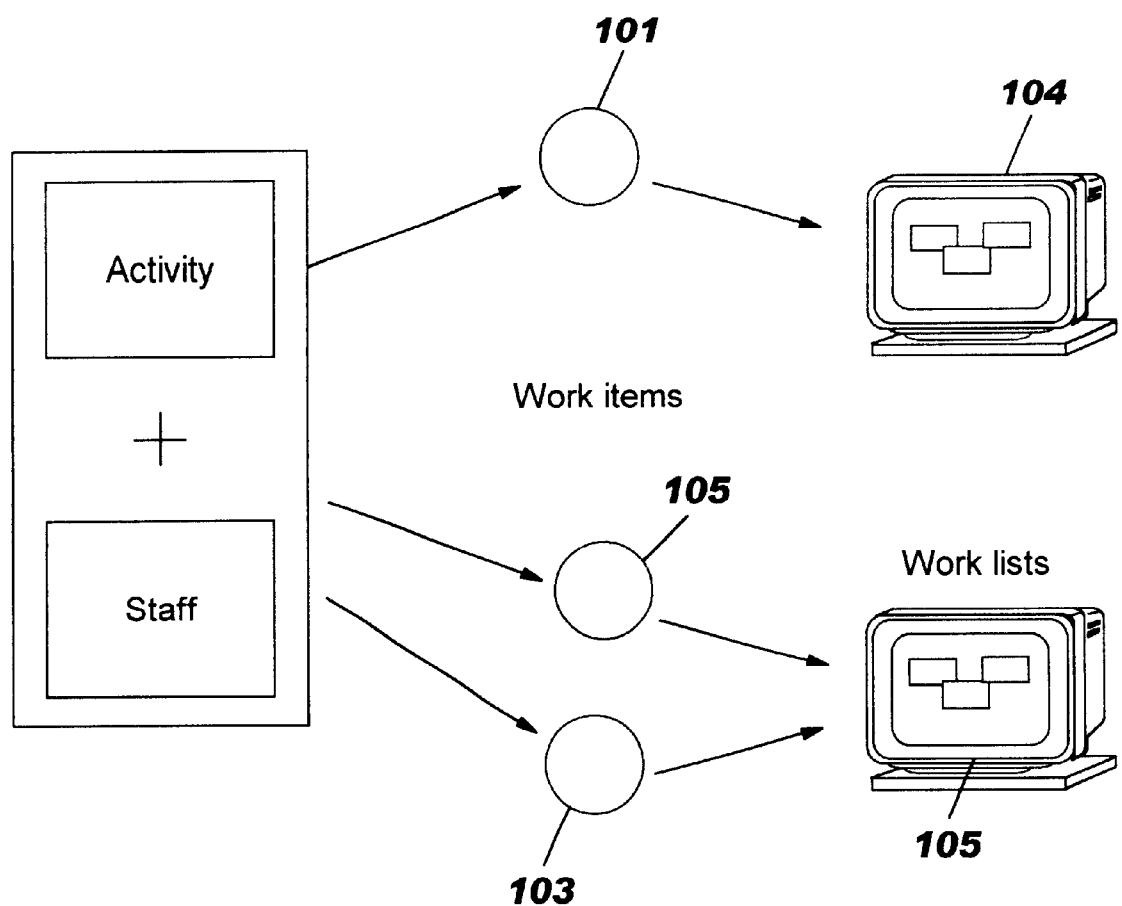
FIG. 1 is an introductory diagram reflecting the first phase of the execution of an activity in a WFMS showing the creation of work items according to prior art technique.

The following is a short outline on the basic concepts of a workflow management system based on IBM's WFMS FlowMark product:

From an enterprise point of view the management of business processes is becoming increasingly important. Business processes control what work items are performed by whom and what resources are exploited for this work. In other words, a business process describes how an enterprise will achieve its business goals. A WFMS may support both the modeling of business processes and their execution.

Modeling of a business process as a syntactical unit in a way that is directly supported by a software system is extremely desirable. The software system can also work as an interpreter getting as input such a model. The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes at buildtime and it drives business processes based on an associated model at runtime. The meta model of IBM's WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark these buildtime definitions of the process models are then converted into process templates for use by FlowMark at runtime. Important components of a FlowMark process model are:

Processes
Activities
Blocks
Control Flows
Connectors
Data Containers
Data Structures
Conditions
Programs
Staff Not all of these elements will be described below.

A process, modeled within FlowMark, is a sequence of activities that must be completed to accomplish a task. The process is the top-level element of a FlowMark workflow model. In a FlowMark process, it can be defined how work is to progress from one activity to the next, which persons are to perform activities and what programs they are to use, and whether any other processes, called subprocesses, are nested in the main process. Multiple instances of a FlowMark process can run in parallel.

Activities are the fundamental elements of the meta model. An activity represents a business action that is from a certain perspective a semantical entity of its own. With the model of the business process, an activity might have a fine-structure that is represented in turn via a model, or the details of it are not of interest from a business process modeling point of view. Refinement of activities via process models allows for both modeling business processes bottom-up and top-down. An activities is a step within a process; it represents a piece of work that the assigned person can complete by starting a program or another process. In a process model, the following information is associated with each activity:

What conditions must be met before the activity can start.
Whether the activity must be started manually by a user or can start automatically.
What condition indicates that the activity is complete.
Whether control can exit from the activity automatically or the activity must first be confirmed as complete by a user.
How much time is allowed for completion of the activity.
Who is responsible for completing the activity.
Which program or process is used to complete the activity.
What data is required as input to the activity and as output from it.

A FlowMark process model consists of the following types of activities:
Program activity: Has a program been assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process been assigned to perform it. The process is invoked when the activity is started. A process activity represents a way to reuse a set of activities that are common to different processes. Output from the process can be used in the exit condition for the process activity and for the transition conditions to other activities.

Control flow of a running process determines the sequence in which activities are executed. The FlowMark workflow manager navigates a path through the process that is determined by start conditions, exit conditions, and transition conditions.

Connectors link activities in a process model. Using connectors, one defines the sequence of activities and the transmission of data between activities. Since activities are not executed arbitrarily, they are bound together via control connectors. A control connector might be perceived as a directed edge between two activities; the activity at the connector's end point cannot start before the activity at the start point of the connector has finished (successfully). Control connectors model the potential flow of control within a business process model. Default connectors specify where control should flow when no other control connector transition condition evaluates to true. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Conditions are the means to specify the flow of control in a process. In FlowMark process models, logical expressions can be defined that are evaluated by FlowMark at runtime to determine when an activity may start, end, and pass control to the next activity. Start conditions are conditions that determine when an activity with incoming control connectors can start. The start condition may specify that all incoming control connectors must evaluate to true, or it may specify that at least one of them must evaluate to true. Whatever the start condition, all incoming connectors must be evaluated before the activity can start. If an activity has no incoming control connectors, it becomes ready when the process or block containing it starts. In addition, a Boolean expression called transition condition is associated with each control connector. Parameters from output containers of activities having already produced their results are followed as parameters referenced in transition conditions. When a runtime activity terminates successfully, all control connectors leaving this activity are determined and the truth value of the associated transition conditions is computed based on the actual values of their parameters. Only the end points of control connectors, the transition conditions of which evaluated to TRUE, are considered as activities that might be executed based on the actual context of the business process. Transition conditions model thus the context dependent actual flow of control within a business process (i.e. an instance of a model). Business processes encompass long running activities in general; such an activity needs to be interrupted. Thus, termination of an activity does not necessarily indicate that the associated task has finished successfully. To measure the successfulness of the work performed by an activity, a boolean expression, called exit condition, is associated with each activity. The activities, the exit condition of which evaluated to true in the actual context, are treated as successfully terminated. Successfully terminated activities are considered to determine precisely the actual control flow. Thus, the logical expression of an exit condition, if specified, must evaluate to true for control to pass from an activity or block.

Besides describing the potential flow of control and data between activities, a business process model also encompasses the description of the flow of the activities between "resources" actually performing the pieces of work represented by each activity. A resource may be specified as a particular program, a person, a role, or an organizational unit. At runtime, tasks are resolved into requests to particular persons to perform particular activities resulting in work items for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the FlowMark workflow manager, and whether it requires user interaction to complete or not, a staff member must be assigned to it. A FlowMark staff definition entails more than identifying people in a FlowMark database. For each person defined, a level, an organization, and multiple roles can be specified. These attributes can be used at runtime to dynamically assign activities to people with suitable attributes.

Process definition includes modeling of activities, control connectors between the activities, input/output containers, and data connectors. A process is represented as a directed acyclic graph, with the activities as nodes and the control/data connectors as the edges of the graph. The graph is manipulated via a built-in, event-driven, CUA compliant graphic editor. The data containers are specified as named data structures. These data structures themselves are specified via the DataStructureDefinition facility. FlowMark distinguishes three main types of activities: program activities, process activities, and blocks. Program activities are implemented through programs. The programs are registered via the Program Definition facility. Blocks contain the same constructs as processes, such as activities, control connectors etc. They are however not named and they have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows the construction of a process through permanent refinement of activities into program and process activities (top-down), but also the building of a process out of a set of existing processes (bottom-up). In particular, process activities help to organize the modeling work if several process modelers are working together. It allows the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situations, but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows changes to the process model without affecting executing process instances. When a process is started, the start activities are located, the proper people are determined, and the activities are posted onto the work list of the selected people as work items. If a user selects a work item, the activity is executed and removed from the work list of any other user to whom the activity has been posted. After an activity has executed, its exit condition is evaluated. If not met, the activity is rescheduled for execution; otherwise all outgoing control connectors and the associated transition conditions are evaluated. A control connector is selected if the condition evaluates to TRUE. The target activities of the selected control connectors are then evaluated. If their start conditions are true, they are posted to the work list of selected people. A process is considered terminated if all end activities have completed. To make sure that all end activities finish, a dead path elimination is performed. It removes all edges in the process graph which can never be reached due to failing transition conditions. All information about the current state of a process is stored in the database maintained by the server. This allows for forward recovery in the case of crashes.

As already indicated above, WFMSs support the definition and execution of business processes. Those business processes are made up of a set of activities which are handled by different people at different places; business processes are therefore processed in most cases in a distributed environment comprising a network of a multitude of computer systems. The activities are generally implemented via programs with which the user interacts and that manage data that is associated with the process. A user typically interacts with the workflow management system via a graphical end user interface that represents the tasks to be performed by the user as icons. Work for a particular task is started by the user by double-clicking on the appropriate icon which in turn starts the program implementing the activity.

Figure 2:
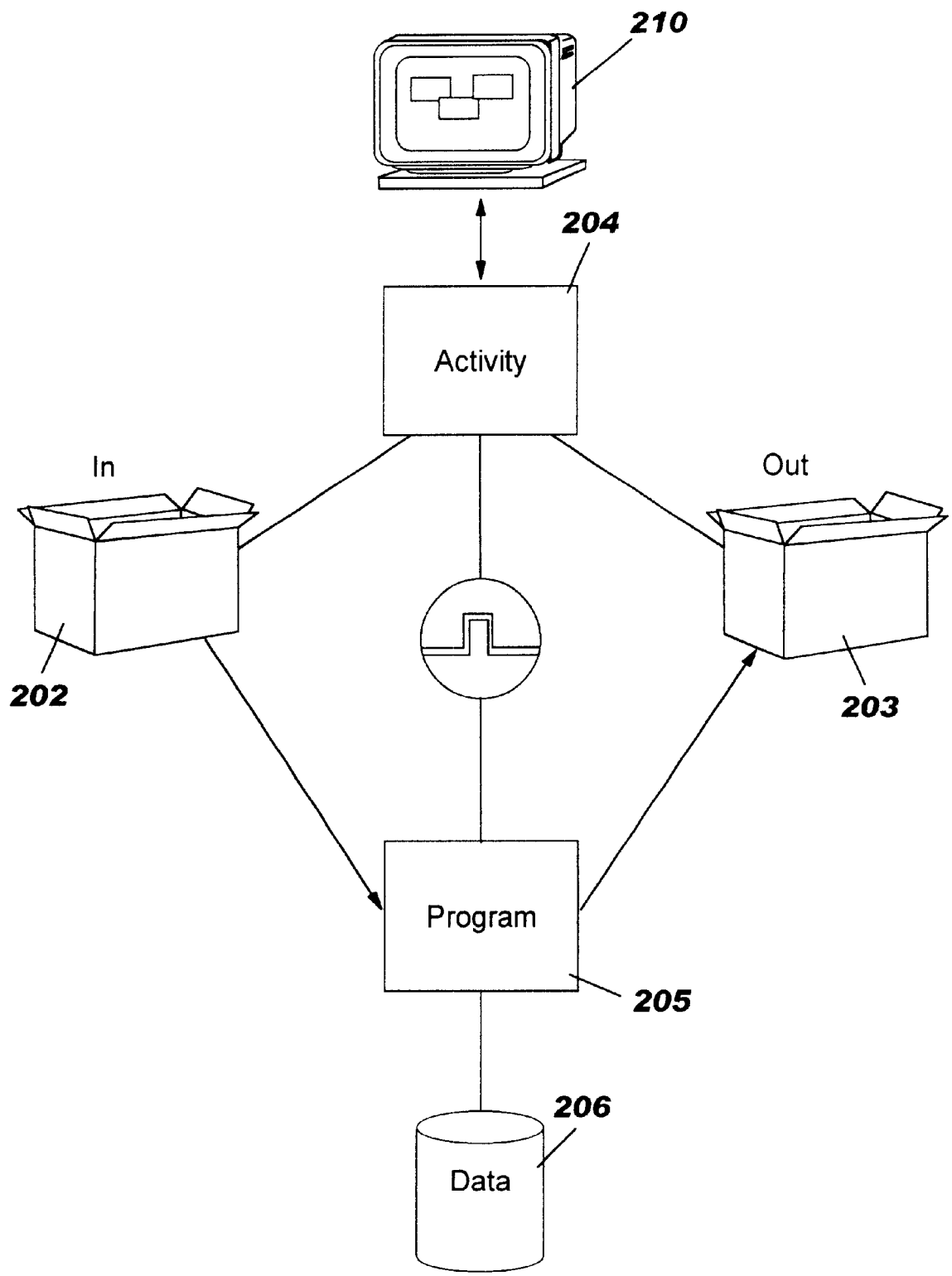
FIG. 2 is an introductory diagram reflecting the second phase of the execution of an activity in a WFMS showing the execution of an activity implementation and it's access to resource/objects by the activity implementation according to prior art technique.

The execution of an activity within a process is performed in two phases visualized in FIG. 1 and FIG. 2. FIG. 1 shows the first phase in which staff resolution is performed. When a process is defined, each activity is assigned an expression (staff assignment) that describes who should perform the activity. The staff assignment is expressed as a query against the organizational database that is part of the workflow management system. When the workflow management system navigates to an activity, it uses that query to find the people who should perform the activity (staff resolution). A work item (101, 102, 103) is created for each of the selected persons. Depending on some settings, the work item is pushed immediately onto the work list (104, 105) of a selected person, or will be made part of the user's work list as the result of an explicit request.

FIG. 2 shows the flow of control when the user starts a work item from the work list representing the second phase of execution of an activity. After double-clicking the work-item representing the execution request of the activity on the work list 201, the workflow management system materializes the input container 202 and/or output container 203 and activates the program 205 that implements the activity 204. The program that is executed typically determines it's context by obtaining some or all of the fields in the input container, interacts with the user, retrieves or modifies some resources/objects 206, or date data, modifies the context by storing this information in the output container, and then terminates. This constitutes the completion of the activity, and navigation through the process graph continues.

It is required that data access must be fast. Otherwise, the user is waiting unproductively before any interaction can be performed.

Thus, the present invention seeks to minimize network traffic during performing said activities. Thus, system performance can be enhanced and overall costs reduced.

DETAILED DESCRIPTION OF THE PREFERRED EMBODIMENTS

With general reference to the figures and with special reference now to FIG. 3, the essential steps of the method according to the invention are described below.

In a first block 110 consisting of steps 112 to 118, statistical and non-statistical data that form essential conditions and constraints are gathered to gain a base collection of facts that serves as input to the traffic minimization function applied later.

Therefore, the number and type of database calls which characterize each database's workload is calculated in a step 112 for each activity and for each table of the distributed relational data base systems being the object to the method of the present invention.

Workload calculation according to prior art techniques can be applied. It starts with determining the number of process instances that are created in a certain time frame, usually collected during business process modeling.

Together with the probabilities that exit and transition conditions evaluate to true -it is possible to determine the number of activities that are executed.

Further, the process distribution is collected. A measure of process concurrency is determined by determining the number of created processes within a given time frame. This information may have already been collected during business modeling, when there are significant peaks in the creation of processes and the overall process is very short.

The process creation distribution multiplied by the activity probabilities yields the execution distribution of each of the activities. Thus, the workload at program granularity is determined.

As a part of creating the activity implementations, the appropriate database access calls are determined. This includes for each SQL call the type, such as insert, replace, or delete, the associated table, and the amount of data transported together with the request or being returned as the result of the request.

The information about the individual SQL calls combined with the activity execution distribution provides for the workload that the database management systems must sustain for each of the databases and tables.

Similar to the processes, the number of business objects is specified.

Combining the derived logical schema with the number of business objects yields the data load for each of the tables. That means the number of rows within each of the tables determines the physical schema, i.e. the number of rows within each of the tables for each of the logical schemes.

Figure 3:
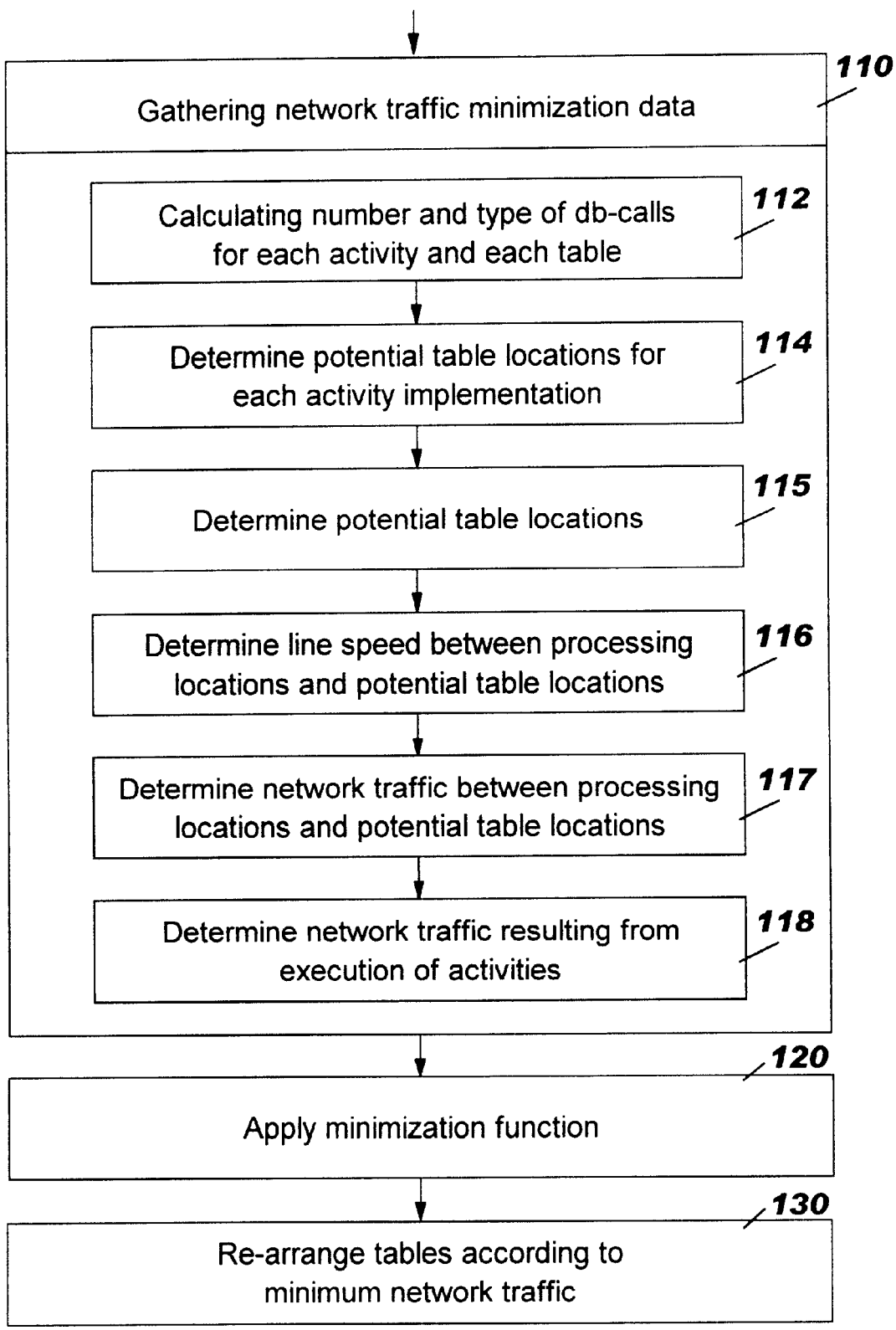
FIG. 3 is a schematic representation of a block diagram showing the essential steps of the method according to the invention.
Figure 4:
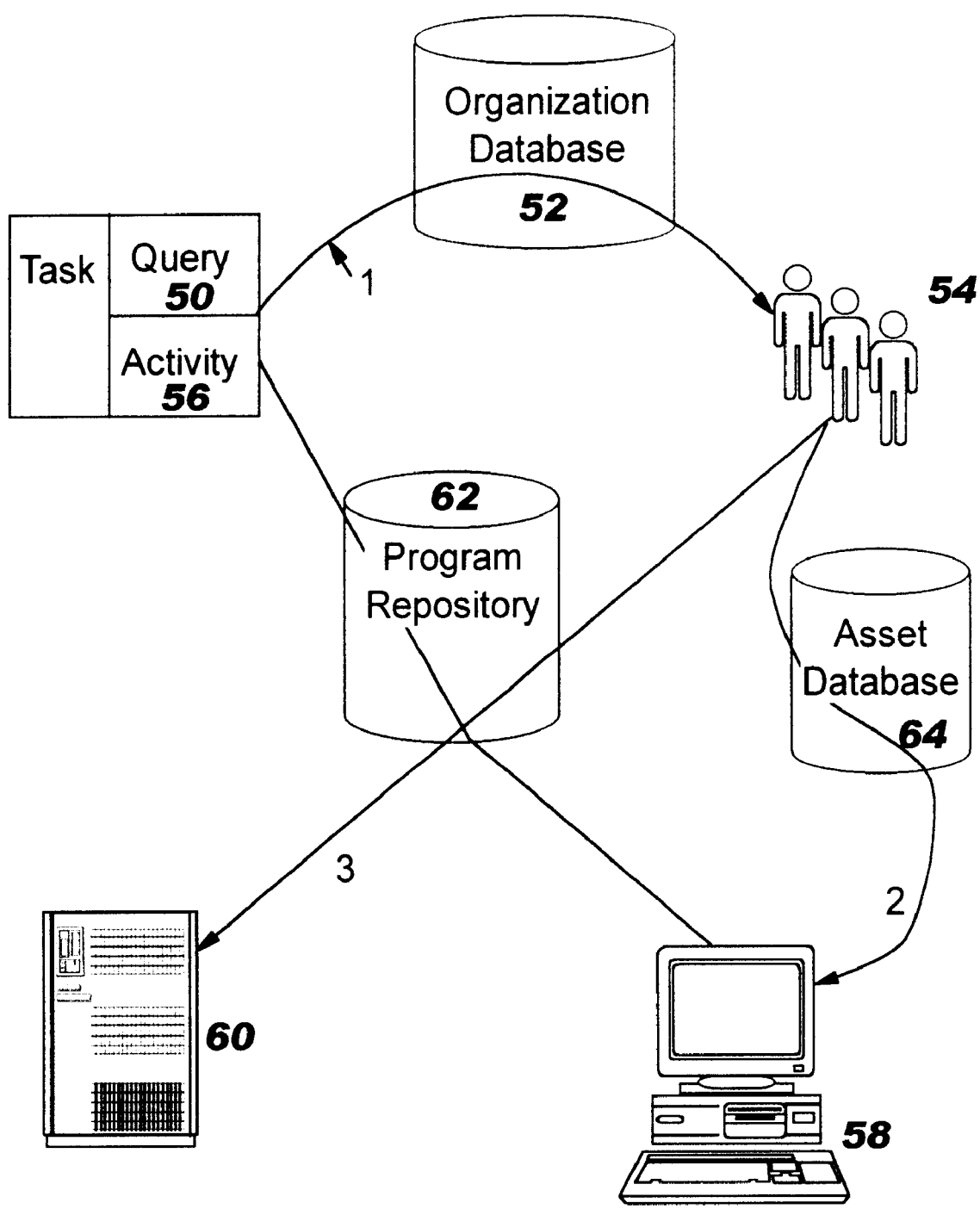
FIG. 4 is a schematic sketch of persons and objects being included in the workstation determination process.

With reference to FIG. 4, step 114 of FIG. 3 is described in more detail.

First, during staff resolution as described above a query 50 against the organizational database 52 is performed to obtain the set 54 of users to whom the activity 56 may be assigned as a work item (arrow 1). Next, the workstation the selected users are working on is determined (arrow 2) by accessing the asset database 64 managed by the systems management system.

Then, it is determined where the activity implementation is running, whether it is the user's work station 58 or on another computer device 60 as well. This information is usually obtained by the program repository 62 which accesses the asset database 64.

As a result of performing step 114 from FIG. 3, the processors, i.e. the workstations on which the activity implementations run which perform the appropriate database accesses is determined.

Further, during a step 115 from FIG. 3 the locations are determined where the tables could be placed. This includes existing hardware, or new hardware locations as well, which have to be created to realize the minimization scenario.

The next step 116 is to determine the line speed between the processors that run the activity implementations and the potential locations that could hold the database tables.

In a next step 117, the traffic between each of the processors that hold the activity implementation and each of the tables is calculated.

The next step 118 is to calculate any traffic that is generated as the result of the operation of the workflow system.

Figure 5:
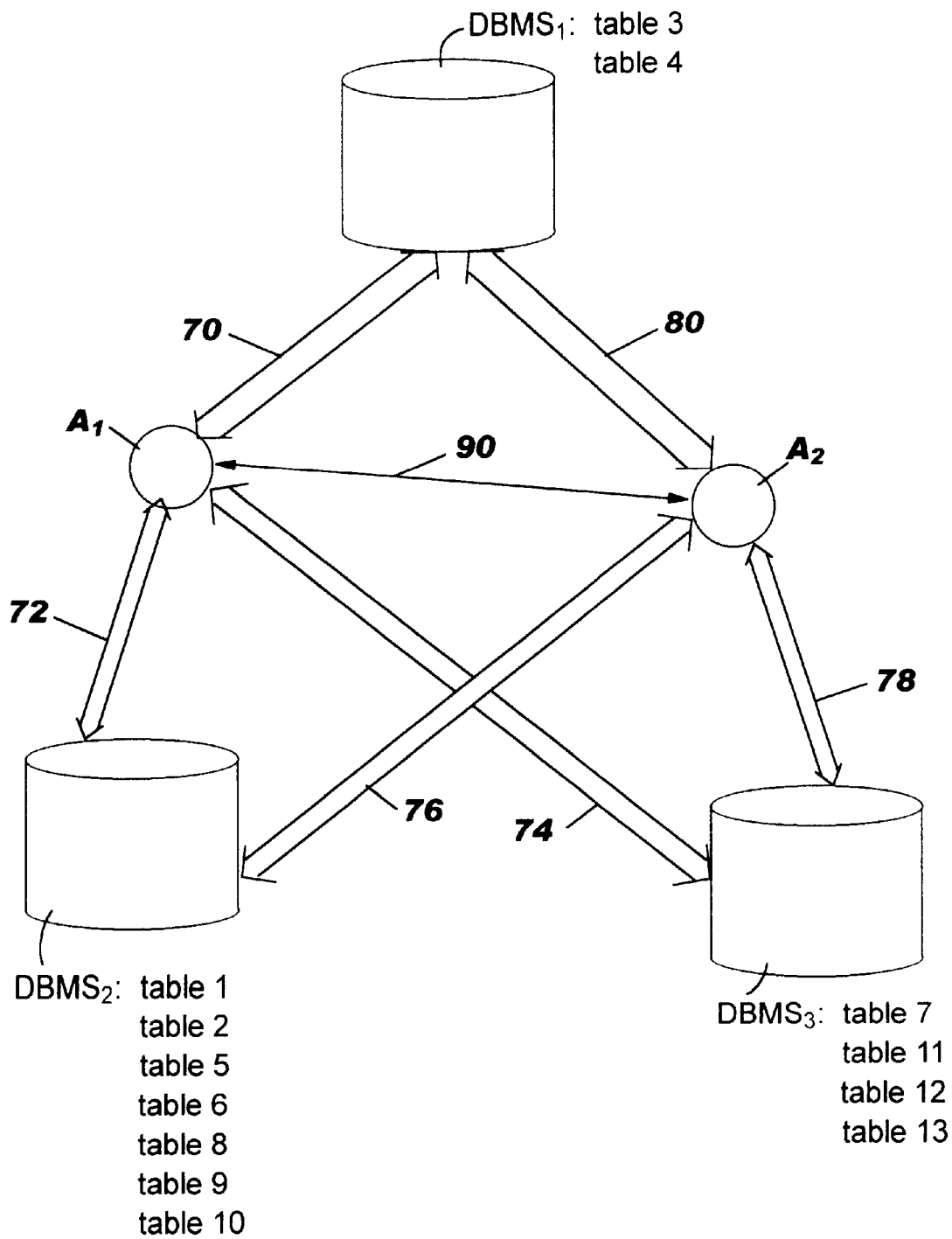
FIG. 5 is a schematic sketch before optimization showing particularly the database traffic generated by performing the activities A1 and A2, which access each a plurality of tables located and managed by respective database management systems.
Figure 6:
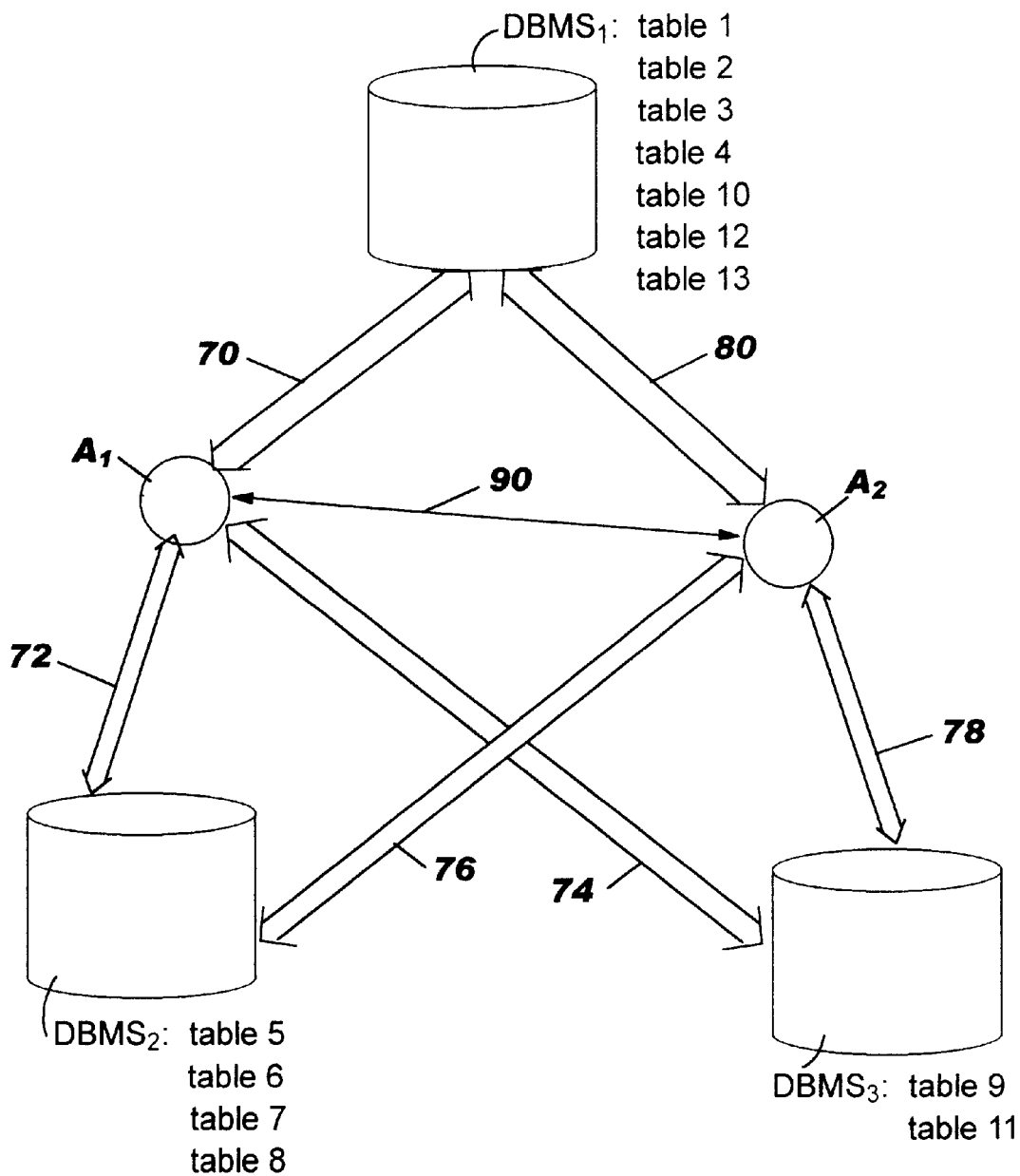
FIG. 6 is a schematic sketch according to FIG. 2 after optimization.

FIG. 5 and FIG. 6, respectively, show schematic sketches depicting the database traffic generated by activities A1 and A2 that access each a plurality of tables located and managed by respective database management systems DBMS1, DBMS2 and DBMS3 before and after applying the novel minimization method.

Before minimizing traffic in the distributed system according to the invention, tables 3 and 4 are located in and managed by DBMS1, tables 1,2,5,6,8,9,10 are located in and managed by DBMS2 and tables 7,11,12,13 are located in and managed by DBMS3.

A1 and A2 are depicted symbolically as circles. Included are the respective staff and workstations which are running the activities as described above.

While running the activities, a database traffic depicted as arrows 70, 72, 74, 76, 78, 80 takes place. This traffic is analyzed by the steps mentioned in block 110 of FIG. 3. Thus, this traffic is the primary subject of the present invention.

Between A1 and A2 an activity related network traffic, i.e. inter-activity traffic 90, is depicted as thin line 90. The minimization of this traffic is not performed by the preferred embodiment of the invention because no database accesses are involved. Nevertheless, such traffic could be considered by including it as restrictive conditions as described above.

Applying the traffic minimization function depicted as step 120 in FIG. 3 yields some results describing a new placement of the tables as is depicted in FIG. 6.

Analysis of the minimization data may have shown in this example that for both workstations included in the circles of A1 and A2, the bandwidth and line speed is best on the data connection 70 and 80. So, DBMS1 should be considered as a local DBMS for both, A1 and A2. "Local" means high bandwidth connections or residence at the same physical node. As most of the tables, i.e. tables 1,2,3,4,10,12,13 are most frequently accessed by activities A1 and A2, these tables are re-arranged from DBMS2 and DBMS3, respectively, onto DBMS1 according to the invention, following the goal of placing tables such that most traffic is as 'local' as possible for each workstation and activity.

Other activities not depicted in the figures frequently access tables 5,6,7,8 in DBMS2 and tables 9,11 in DBMS3. Further, bandwidth and line speed on connections 72,74, 76,78 are not as good as that of connections 70 and 80. As these facts and further facts that were collected in block 110 were included in the minimization method, table 7 is re-arranged from DBMS3 to DBMS2, and table 9 is re-arranged from DBMS2 to DBMS3.

As seen from the above, with all necessary data collected in block 110, it can be calculated where the appropriate tables should be placed so that the network traffic is minimized.

The minimizing problem can not be solved exactly if there are a large number of tables and processors involved. However heuristic approaches have been developed over time that allow the determination of a solution that is sufficiently exact to correspond to the inexactness implied by the inexact numbers used as input.

To focus on the kernel of the present invention the outlined calculation has been simplified. The following arguments, however, have to be considered, if applicable:

It is assumed that the processors that run the database management system are capable of potentially handling the complete load. If this is not the case, additional restrictions must be considered.

The network traffic is solely created by the workflow system and the activity implementations. If other applications generate additional network traffic, this must be considered, as well.

SQL calls that involve multiple tables, such as JOINs, may use tables that are managed by different database management systems. In this case the database management systems must exchange data. The appropriate information can be derived from the data load and the way the optimizer of the database management systems work. This must also be factored into the network traffic.

The method described above can be incorporated in a program that is coupled with the process models underlying the business processes to be performed in the networked computer system.

As seen from above, the method according to the invention can be derived from the process model of the distributed applications.

The invention has been described with reference to a specific exemplary embodiment. It will be evident that various modifications and changes may be made thereto without departing from the spirit and scope of the invention as set forth in the appended claims. The specification and drawings are to be regarded as illustrative rather than restrictive.

What is claimed is:

1. A method for minimizing network traffic of distributed applications operating in a distributed environment in a networked computer system comprising a plurality of workstations and a plurality of database management systems (DBMS) managing data in a set of distributed tables for use by the workstations, in which computer system said distributed application comprises usage of a plurality of programs of which at least some access some of said tables, the method comprising the steps of gathering (110) network traffic minimization data related to access of said tables, applying (120) an overall minimization function including said minimization data, and placing (130) said tables at a location in the network such that the network traffic is minimized, wherein said distributed application comprises a workflow management system (WFMS), the workflow of which comprises a business process which is performed by a plurality of program activities accessing said tables, and wherein the step of gathering (110) network traffic load minimization data comprising one of the steps of determining where the tables can be located, determining the line speed between the activity running processors and the potential table locations, determining the network traffic between the activity running processors and the potential table locations, calculating network traffic generated as a result of the execution of activities.

2. A program tool for minimizing network traffic of distributed applications operating in a distributed environment in a networked computer system comprising a plurality of workstations and a plurality of database management systems (DBMS) managing data in a set of distributed tables for use by the workstations, in which computer system said distributed application comprises usage of a plurality of programs of which at least some access some of said tables, the program tool comprising means for gathering network traffic minimization data related to access of said tables, means for applying an overall minimization function including said minimization data, and means for placing said tables at a location in the network such that the network traffic is minimized, wherein said means for gathering network traffic minimization data comprising one of the means for determining where the tables can be located, determining the line speed between the activity running processors and the potential table locations, determining the network traffic between the activity running processors and the potential table locations, calculating network traffic generated as a result of the execution of activities.

\* \* \* \* \*